United States Patent
Ravikumar et al.

(10) Patent No.: US 12,536,109 B2
(45) Date of Patent: *Jan. 27, 2026

(54) MEMORY VALIDATION

(71) Applicant: Waymo LLC, Mountain View, CA (US)

(72) Inventors: Sabareeshkumar Ravikumar, Sunnyvale, CA (US); Shishuang Sun, Cupertino, CA (US); Feng Wang, San Jose, CA (US); Ji Zhang, Santa Clara, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/891,506

(22) Filed: Sep. 20, 2024

(65) Prior Publication Data
US 2025/0013586 A1 Jan. 9, 2025

Related U.S. Application Data

(63) Continuation of application No. 18/523,433, filed on Nov. 29, 2023, now Pat. No. 12,124,386, which is a continuation of application No. 18/045,015, filed on Oct. 7, 2022, now Pat. No. 11,868,286, which is a
(Continued)

(51) Int. Cl.
*G06F 13/16* (2006.01)
*G06F 12/02* (2006.01)
*G06F 13/42* (2006.01)

(52) U.S. Cl.
CPC ...... *G06F 13/1668* (2013.01); *G06F 12/0246* (2013.01); *G06F 13/4234* (2013.01); *G06F 2212/7209* (2013.01)

(58) Field of Classification Search
CPC ............ G06F 13/1668; G06F 12/0246; G06F 13/4234; G06F 2212/7209
See application file for complete search history.

(56) References Cited

U.S. PATENT DOCUMENTS

| 5,757,809 A | 5/1998 | Kiso et al. |
| 5,956,349 A | 9/1999 | Watanabe et al. |
| 6,282,611 B1 | 8/2001 | Hamamoto et al. |

(Continued)

FOREIGN PATENT DOCUMENTS

| CN | 207020273 | 2/2018 |
| JP | 2594757 | 3/1997 |

(Continued)

OTHER PUBLICATIONS

Del Rio Ruiz, et al., "Experimental Frequency Tuning Methodology of a Cantilever Pizoelectric Harvester Validated in a Multimodal Transportation", Electronics 2020, 9, 79; doi: 10.3390/electronics 9010079, pp. 1-11.

*Primary Examiner* — Tasnima Matin
(74) *Attorney, Agent, or Firm* — McDonnell Boehnen Hulbert & Berghoff LLP

(57) ABSTRACT

One example method of testing an electrical device comprises transmitting a data pattern to a memory device of the electrical device by a controller of the electrical device to provide a written data pattern to the memory device, wherein the data pattern replicates a resonant frequency of at least a portion of the electrical device, reading the written data pattern from the memory device with the controller, and comparing the written data pattern to the data pattern.

20 Claims, 10 Drawing Sheets

Related U.S. Application Data continuation of application No. 17/137,264, filed on Dec. 29, 2020, now Pat. No. 11,494,317.

(56) References Cited

U.S. PATENT DOCUMENTS

| | | |
|---|---|---|
| 6,295,620 B1 | 9/2001 | Togo |
| 6,542,427 B2 | 4/2003 | Roohparvar |
| 6,678,621 B2 | 1/2004 | Weiner et al. |
| 7,023,741 B2 | 4/2006 | Nakamura et al. |
| 7,043,379 B2 | 5/2006 | Gauthier |
| 7,043,683 B2 | 5/2006 | Amick et al. |
| 7,088,246 B2 | 8/2006 | Fukuoka |
| 7,290,078 B2 | 10/2007 | Zink et al. |
| 7,646,303 B2 | 1/2010 | Waters et al. |
| 8,364,881 B2 | 1/2013 | Urabe |
| 8,498,172 B1 | 7/2013 | Patton, III et al. |
| 8,692,411 B2 | 4/2014 | Uchida |
| 8,806,233 B2 | 8/2014 | Soman |
| 8,809,970 B2 | 8/2014 | Suzuki et al. |
| 8,886,893 B2 | 11/2014 | Miura et al. |
| 9,409,533 B2 | 8/2016 | Maini et al. |
| 9,786,356 B2 | 10/2017 | Wang et al. |
| 2004/0088624 A1 | 5/2004 | Gauthier et al. |
| 2004/0183450 A1 | 9/2004 | Busse et al. |
| 2012/0059526 A1 | 3/2012 | Maini et al. |
| 2015/0162061 A1 | 6/2015 | Gopalakrishnan et al. |
| 2018/0221796 A1 | 8/2018 | Bonifas et al. |
| 2019/0201073 A1 | 7/2019 | Nott et al. |
| 2019/0274749 A1 | 9/2019 | Brady et al. |
| 2020/0066367 A1 | 2/2020 | Lingambudi et al. |
| 2020/0310520 A1 | 10/2020 | Badrieh et al. |

FOREIGN PATENT DOCUMENTS

| | | |
|---|---|---|
| JP | 2006-268919 | 10/2006 |
| JP | 2008-192309 | 8/2008 |
| WO | WO2012/024295 | 2/2012 |
| WO | WO2019/224910 | 11/2019 |

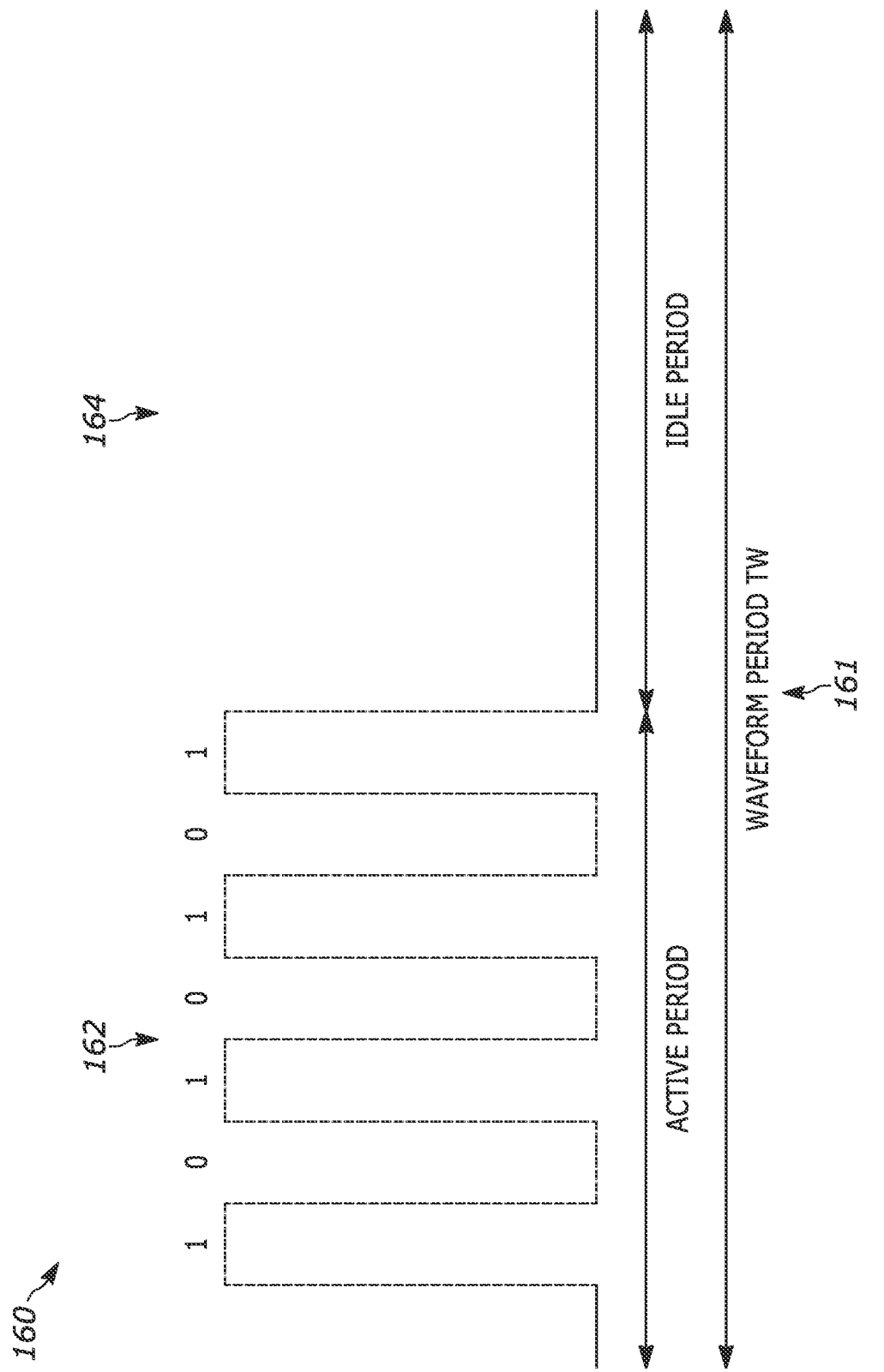

MEMORY VALIDATION

REFERENCE TO RELATED APPLICATIONS

This is a continuation of U.S. patent application Ser. No. 18/523,433, filed Nov. 29, 2023, which is a continuation of U.S. patent application Ser. No. 18/045,015, filed Oct. 7, 2022, which is a continuation of U.S. patent application Ser. No. 17/137,264, filed Dec. 29, 2020, the entirety of each of which is hereby incorporated by reference.

BACKGROUND

Autonomous vehicles use various computing systems to aid in the transport of passengers from one location to another. Some autonomous vehicles may require some initial input or continuous input from an operator, such as a pilot, driver, or passenger. Other systems, such as autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

Such vehicles are equipped with various types of sensors in order to detect objects in the surroundings. For example, autonomous vehicles may include lasers, sonar, radar, cameras, and other devices that scan and record data from the vehicle's surroundings. These devices in combination (and in some cases alone) may be used to determine the location of the object in three-dimensional space.

The various types of sensors are electrically coupled to processors and computer readable memory by integrated circuits. The integrated circuits have power distribution networks through which power from a power supply is transmitted to the processors and computer readable memory. Due to the impedance in the integrated circuit, the voltage received at the processors and the computer readable memory is lower than the voltage provided at the power supply.

In certain conditions, the data signal from one or more of the various sensors can substantially replicate the resonant frequency of the power supply circuit. The resonance can cause a significant increase in impedance and a resulting significant drop in supplied voltage. The low voltage can result in high or "1" bits of the data signal being recorded as low or "0" bits in the memory.

Resonance can additionally affect the power delivery network. Data signals similar to the resonant frequency of the power delivery network, or the link between the power supply and the integrated circuit, can increase noise on the power delivery network. Noise on the power delivery network causes variations in the voltage supplied, which can result in high bits being recorded as low bits, low bits being recorded as high bits, or even voltage spikes that could potentially damage one or more electrical components of the system.

Existing methods of validating integrated circuits are performed by external devices during manufacturing. Once validation is completed, the integrated circuit is implemented into devices, such as autonomous vehicles.

SUMMARY

In one example, a method of testing an electrical device includes transmitting a data pattern to a memory device of the electrical device by a controller of the electrical device to provide a written data pattern in the memory device, wherein the data pattern replicates a resonant frequency of at least a portion of the electrical device, reading the written data pattern from the memory device with the controller, and comparing the written data pattern to the data pattern.

In another example, an electrical system includes a controller, computer readable memory communicably coupled to the controller, and a power supply coupled to the computer readable memory by a power distribution network. The computer readable memory has stored thereon a data pattern replicating a resonant frequency of at least a portion of the electrical system and has stored thereon executable instructions that, upon execution by a computer system, cause the controller to transmit a copy of the data pattern to the computer readable memory to provide a written data pattern in the computer readable memory.

In a still further example, a method of testing a device includes determining a resonant frequency of at least a portion of the device, storing the resonant frequency on computer readable memory of the device, transmitting a data pattern replicating the resonant frequency from a controller of the device to the computer readable memory, in response to receiving the data pattern at the computer readable memory from the controller, writing data to the computer readable memory to provide written data in the computer readable memory, and comparing the written data to the data pattern.

In one example, a system includes a controller, a power supply electrically coupled to the controller by a power link, and computer readable memory. The computer readable memory has stored thereon a sequence of data or data pattern configured to replicate a resonant frequency of at least a portion of the system and executable instructions that, upon execution by a computing system causes the controller to write a copy of the data pattern to memory. The executable instructions further cause the controller to read the copy of the data pattern to determine if it was stored accurately.

In another example, a system includes a controller, a power supply electrically coupled to the controller by a power link, and computer readable memory. The controller is configured to transmit a data pattern replicating a resonant frequency of at least a portion of the electrical system to the computer readable memory to provide a written data pattern in the computer readable memory. In some forms, the controller comprises a fixed function circuit configured to generate and transmit the data pattern.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 3B illustrates a second simplified data pattern according to example embodiments.

DETAILED DESCRIPTION

Figure 1:
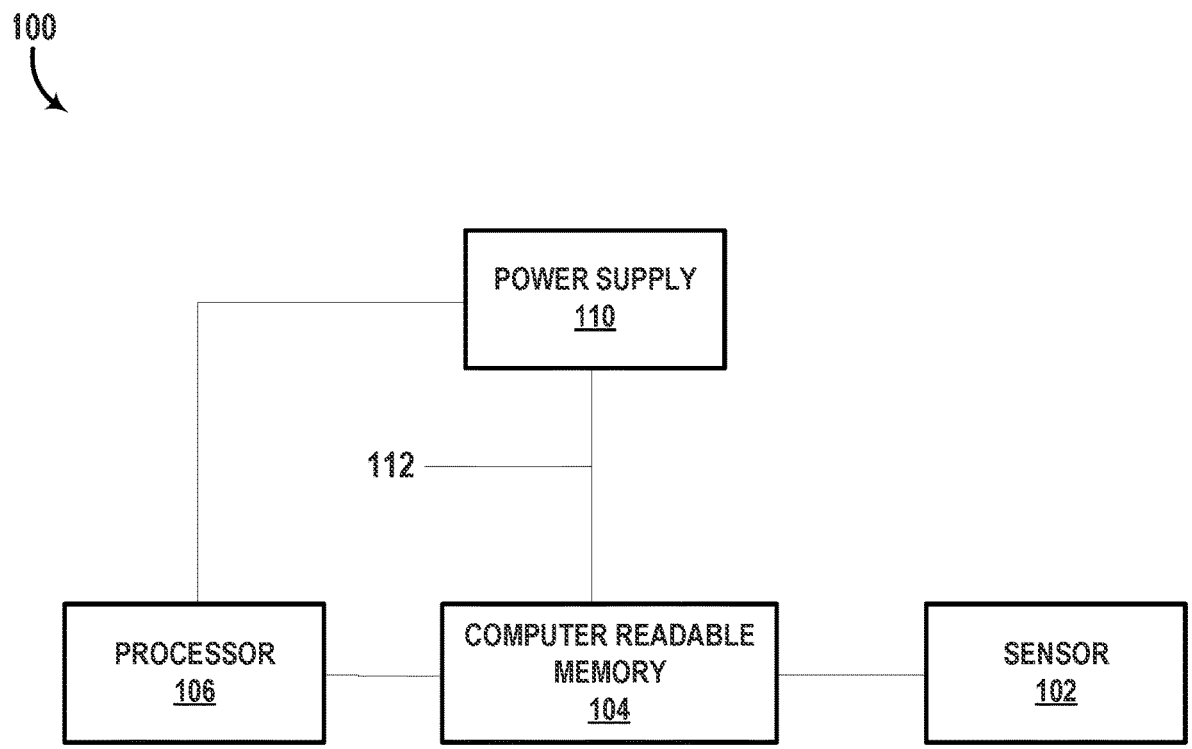
FIG. 1 is a simplified block diagram of a system, according to example embodiments.

Exemplary implementations are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations.

A vehicle, such as an autonomous vehicle, can utilize data from multiple sensors, such as a stereo image sensor system and an active sensor, to generate a representation of a scanned environment. The data from the multiple sensors can be used to identify objects within the scanned environment and estimate the distance between the vehicle and the identified objects.

The sensor system includes the above discussed sensors as well as memory circuits having one or more controllers and computer readable memory connected to a power supply by a power delivery network or power link circuit. Data from the sensors is stored in the computer readable memory, either directly or after being processed by the one or more controllers.

During manufacturing, the various components of the sensor system are tested or validated for accuracy and reliability. This includes validating the memory circuits to determine if data transmitted to the memory circuits is accurately stored under multiple conditions.

However, during use environmental factors and/or standard wear can affect the performance of the memory circuit including the power supply. In some instances, the consistency of the power supplied by the power supply can change over time. Alternatively or additionally, the impedance of the memory circuit and/or the power distribution network can change.

Example devices, systems, and methods herein relate to periodic or planned self-testing of a memory device using a data pattern replicating the resonant frequency of at least a portion of the system. The self-testing can be performed at different stages of manufacturing and use, including standalone chip-level testing during chip fabrication, board level testing during board fabrication, and full system testing once installed in a vehicle. In some forms, the self-testing can be implemented as part of a power on self-test ("POST") sequence for a vehicle so as to be performed every time the vehicle is powered on. One example device may include computer readable memory storing a data pattern replicating the resonant frequency of the power distribution network such that writing the data pattern to memory causes a significant change in impedance of the power distribution network.

FIG. 1 illustrates a system 100 having a sensor 102, computer readable memory 104, a controller 106, and a power supply 110 connected to the computer readable memory 104 by a power distribution network 112. In operation, the power supply 110 provides power to the computer readable memory 104 via the power distribution network 112. The power supplied to the computer readable memory 104 includes both low voltage and high voltage power. The power supply 110 can further provide power to other elements of the system 100, such as the controller 106.

The controller 106 includes one or more devices for controlling operation of the system 100. The controller 106 can include a processor for transmitting sensor data to the computer readable memory 104 and/or reading and processing data from the computer readable memory 104. In some forms, the processor further performs the resonance self-testing described herein. Alternatively or additionally, the controller 106 can include a fixed function circuit or application specific integrated circuit ("ASIC") configured to perform the resonance self-testing of the system 100.

The computer readable memory 104 includes one or more memory devices configured to store electronic data. In some forms, the computer readable memory 104 includes non-transitory memory such a Random Access Memory ("RAM"), Dynamic Random Access Memory ("DRAM"), Double Data Rate ("DDR") memory, or other types of computer readable memory.

When data is written to the computer readable memory 104 from the controller 106 or sensor 102, individual cells within the computer readable memory are operably coupled to the power supply 110 so as to be charged and discharged thereby. Consecutive bits within the data having different values, for example a low bit followed by a high bit, result in switching between the high and low voltages. However, consecutive bits within the data having the same value do not cause switching.

Figure 2:
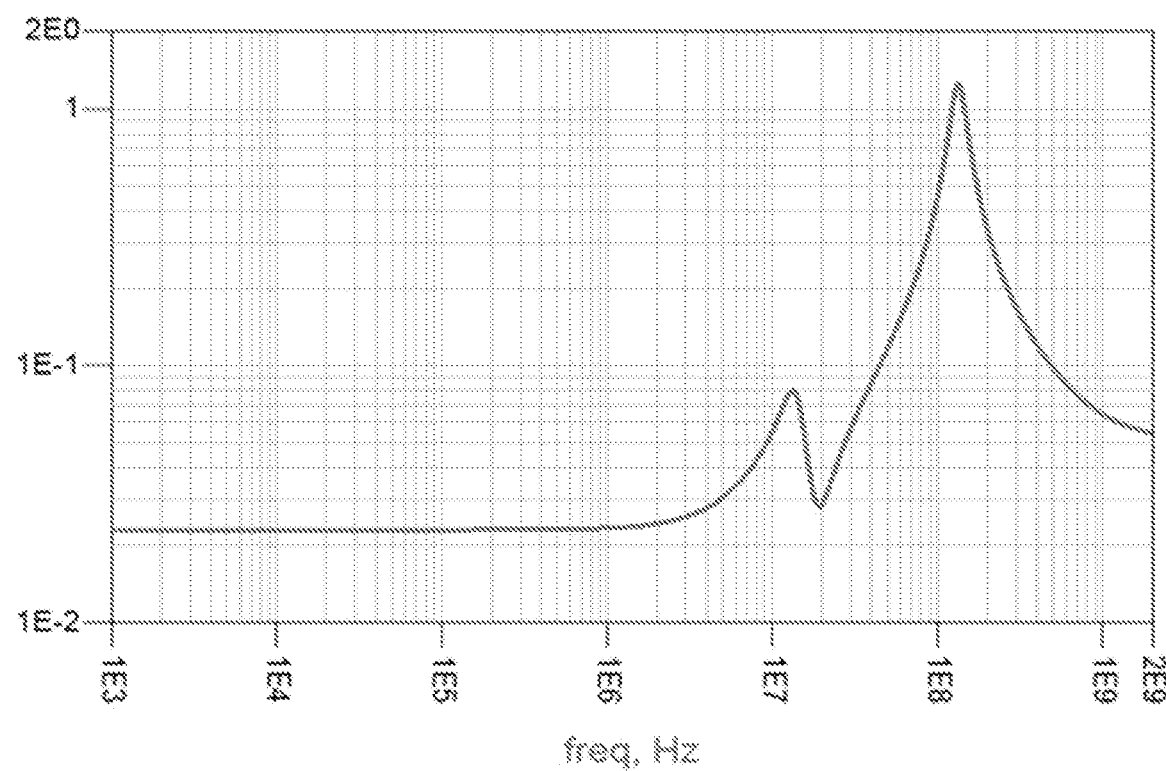
FIG. 2 illustrates the impedance of a system versus the switching frequency of the system.

A data pattern that causes switching at approximately the resonant frequency of the power distribution network 112 can cause a resonance in the power distribution network 112. The resonance causes the effective impedance seen during operation to increase, thus increasing noise in the supplied power. FIG. 2 illustrates the impedance of a power distribution network versus the frequency of switching. As shown, the impedance rises as the switching frequency approaches the resonant frequency of approximately 1.5E8 Hz. The impedance at the resonant frequency is orders of magnitude higher than the impedance at other frequencies, such as at 1E3 to 1E6 Hz. It is understood that the values illustrated in FIG. 2 are only intended as illustrative examples. Different power distribution networks can experience resonance at different frequencies based on the physical design of the circuit. Further, the amount of change in impedance experienced during resonance will vary between different power distribution networks.

Figure 7:
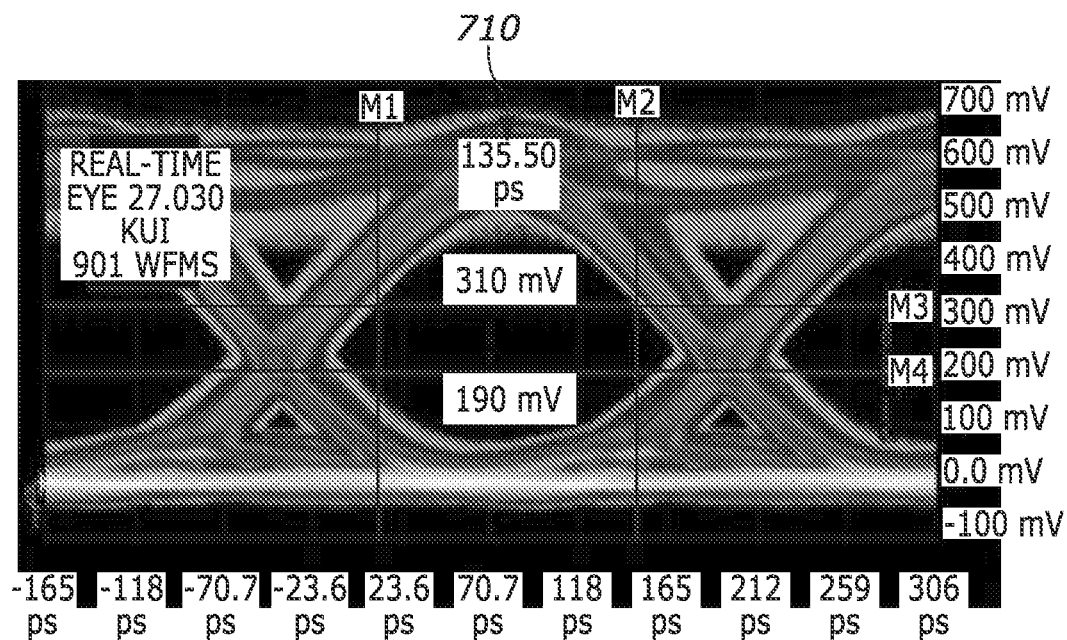
FIG. 7 illustrates two voltage patterns of a power distribution network.
Figure 7:
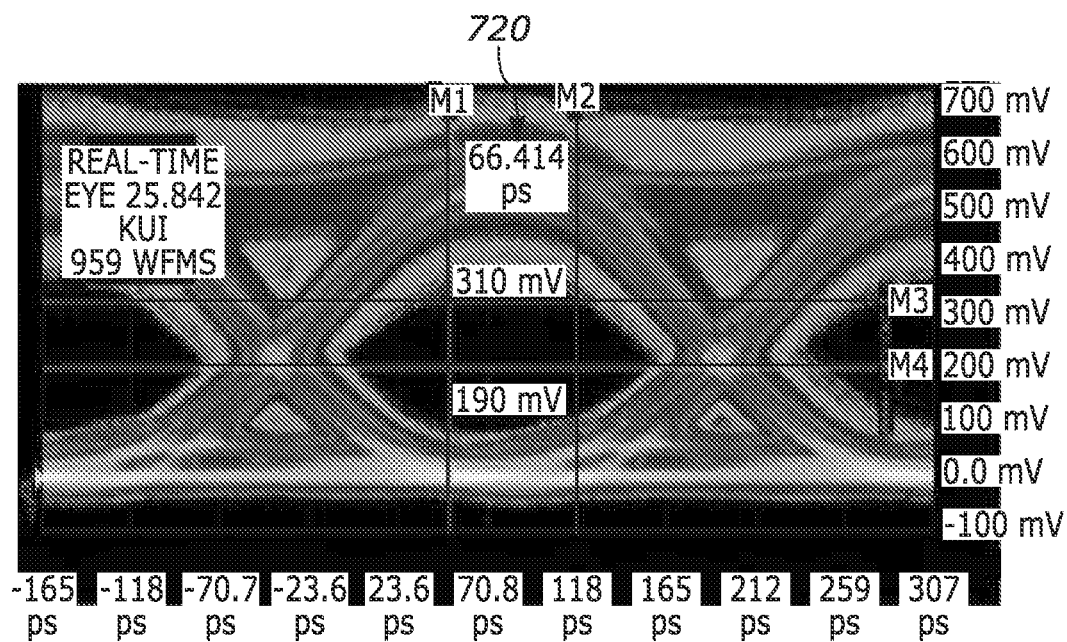

Resonance within the power distribution network 112 can cause a drop in voltage supplied to the computer readable memory 104 and/or an increase in noise on the power distribution network 112. This can result in errors in the writing of data to the computer readable memory 104. An increase in noise caused by resonance is illustrated in FIG. 7. FIG. 7 illustrates a voltage pattern 710 illustrating the voltage supplied by a power distribution network while not in resonance and a voltage pattern 720 illustrating the voltage supplied by the same power distribution network while in resonance. As shown, the high voltage value delivered in the first voltage pattern 710 varies from approximately 450 mV to approximately 650 mV. In contrast, the high voltage value delivered in the second voltage pattern 720 varies from approximately 310 mV to approximately 700 mV. This higher amount of noise in the power supply can cause errors in the memory as discussed above. It is understood that the values illustrated in FIG. 7 are only intended as illustrative examples. Different power distribution networks can deliver different voltage values, and resonance can have a larger or smaller effect on the voltage delivered based on the design of the power distribution network.

The likelihood of resonance caused error in data recording can be reduced by testing the system to verify that data is recorded accurately even while the power distribution network 112, or other portions of the system, is resonating. Such testing may involve writing a data pattern to the computer readable memory 104 that causes switching at a frequency substantially equal to the resonant frequency.

In some examples, the resonant frequency of the power distribution network 112 is predetermined. A power distribution network 112 can be modeled and then simulations can be performed on the model to approximate the resonant frequency thereof. A range of frequencies can then be applied to the power distribution network sweeping over the approximated resonant frequency to determine a more precise resonant frequency value.

In some examples, the computer readable memory 104 stores a data pattern replicating the resonant frequency of at least a portion of the system 100. The computer readable memory 104 further stores executable instructions that when executed cause the controller 106 to write a copy of the data pattern to the computer readable memory 104. As discussed above, the computer readable memory 104 may comprise a plurality of memory devices. Accordingly, the controller may write the copy of the data pattern to a separate memory device than the memory device storing the data pattern and the executable instructions. Alternatively, as described above, the data pattern replicating the resonant frequency is produced by an ASIC of the controller 106 and written to the computer readable memory 104 thereby.

Because the system 100 includes both a controller 106 and the computer readable memory 104, the resonance test is performed without the use of an external device. Additionally, the resonance test is performed without placing the components in a testing state. Thus, the system 100 can perform the resonance test during standard operation without direct input from a user. For example, the resonance test can be performed periodically at predetermined time intervals. Alternatively or additionally, the resonance test is performed when certain parameters are met, such as when the sensor 102 is not transmitting data.

The executable instructions further cause the controller to read the data pattern copy from the computer readable memory 104 and compare the data pattern copy to the data pattern to verify that the data pattern copy was accurately recorded. If the data pattern copy does not match the data pattern, the controller can cause an alert to be sent to a user interface. For example, an error alert or maintenance request can be displayed on a user interface within the vehicle. Alternatively or additionally, an alert can be transmitted to a remote monitor such as the vehicle owner, manufacturer, or a vehicle maintenance individual.

Figure 3A:
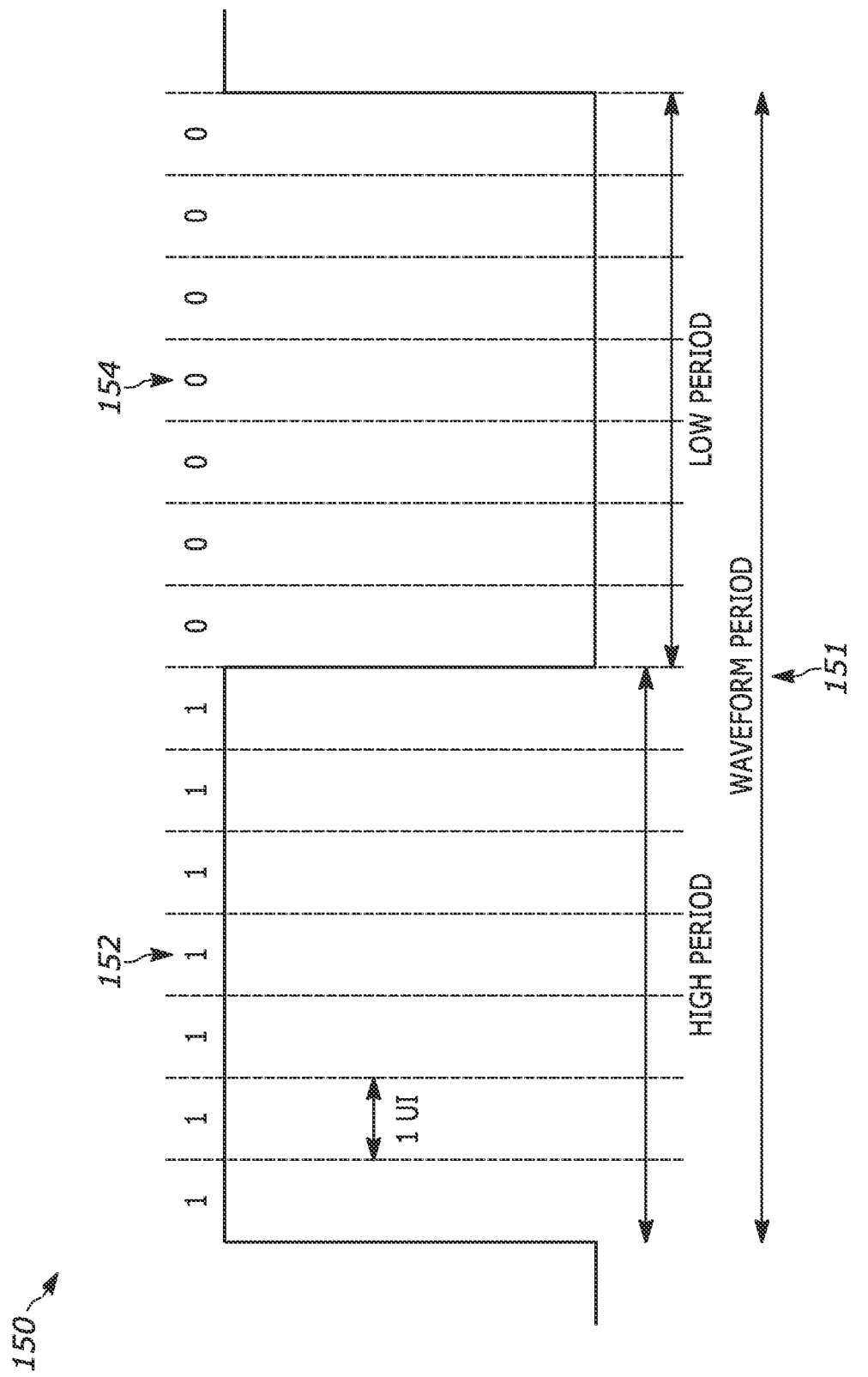
FIG. 3A illustrates a first simplified data pattern according to example embodiments.
Figure 4A:
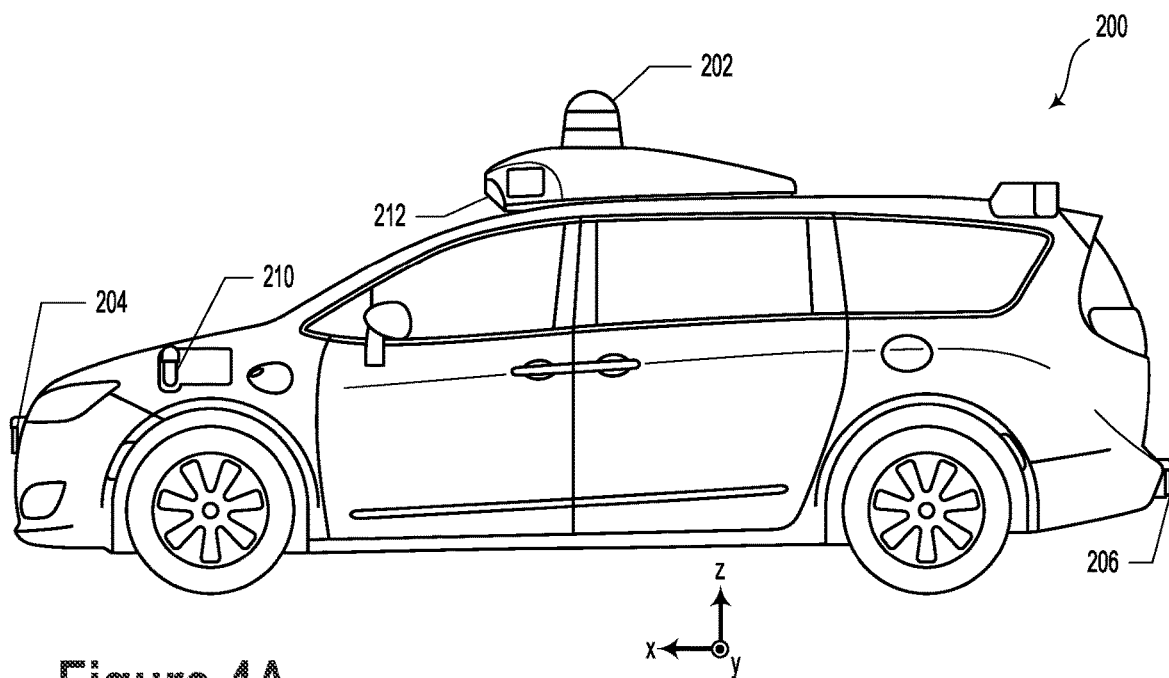
FIG. 4A illustrates a vehicle equipped with a sensor system, according to an example embodiment.
Figure 4B:
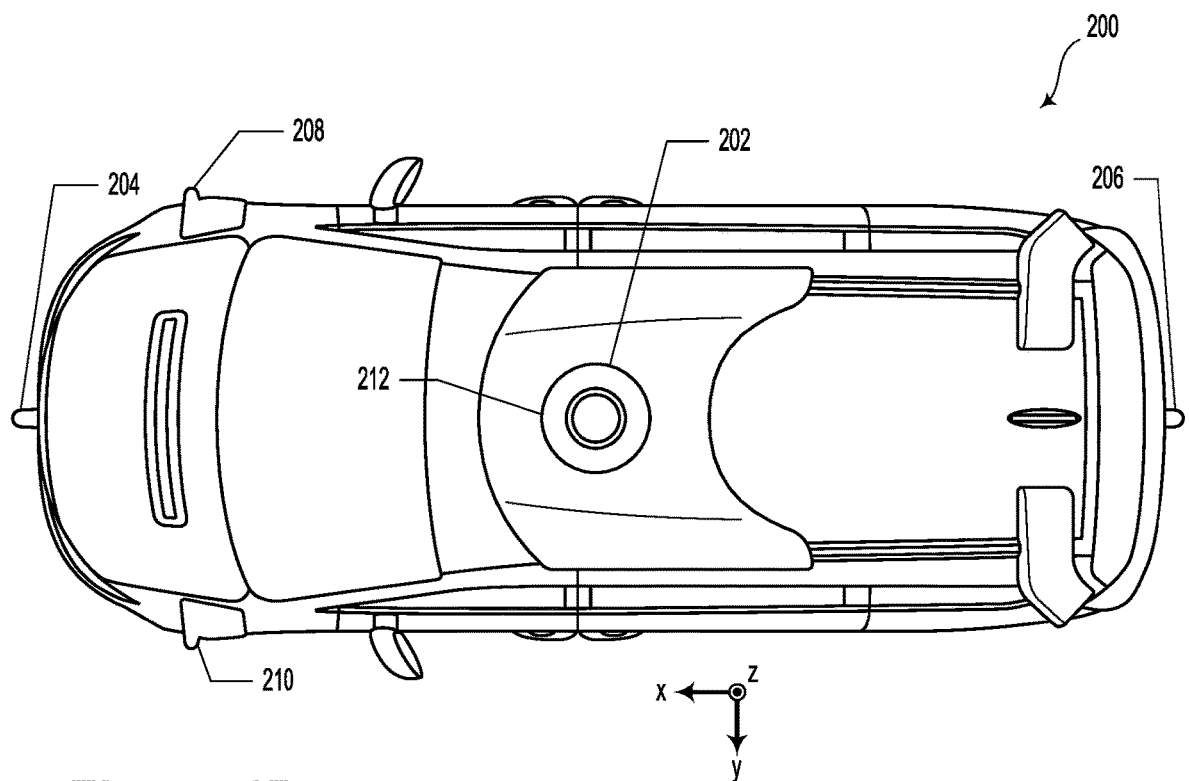
FIG. 4B illustrates a vehicle equipped with a sensor system, according to an example embodiment.
Figure 4C:
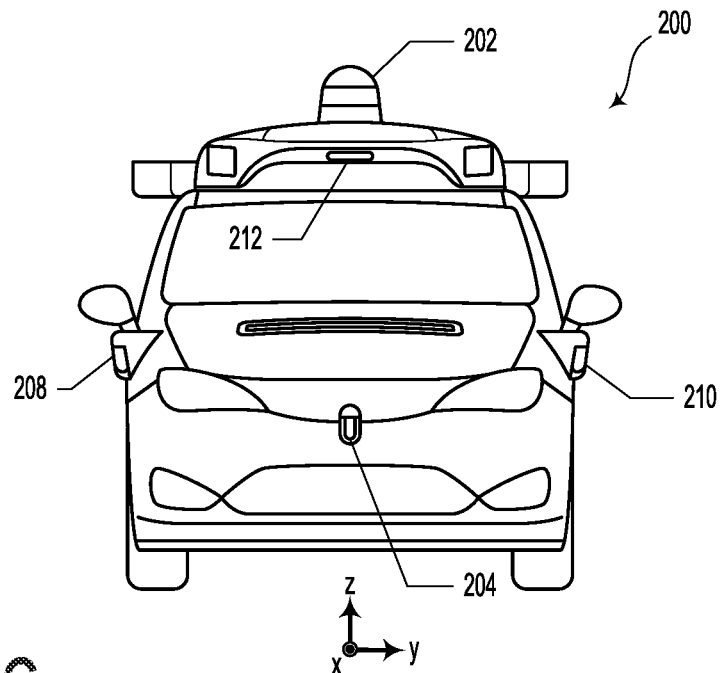
FIG. 4C illustrates a vehicle equipped with a sensor system, according to an example embodiment.
Figure 4D:
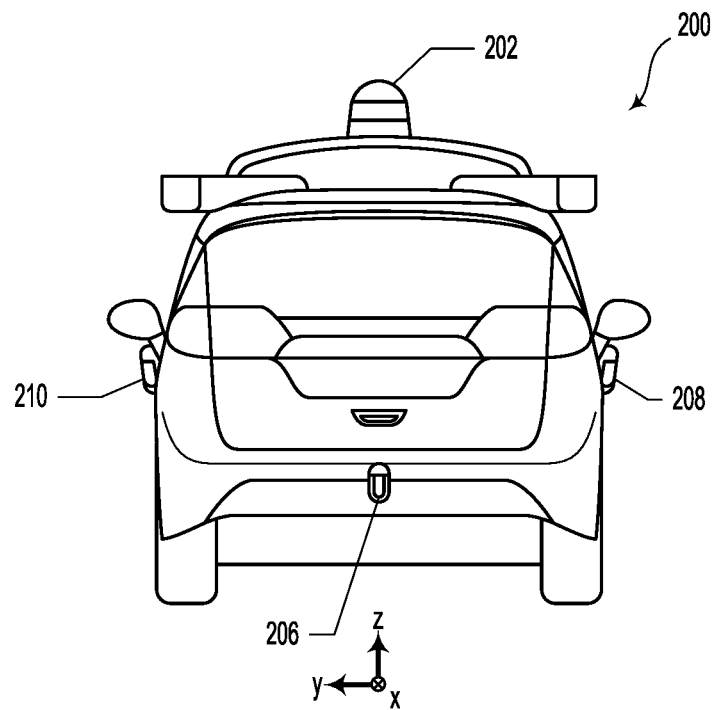
FIG. 4D illustrates a vehicle equipped with a sensor system, according to an example embodiment.
Figure 4E:
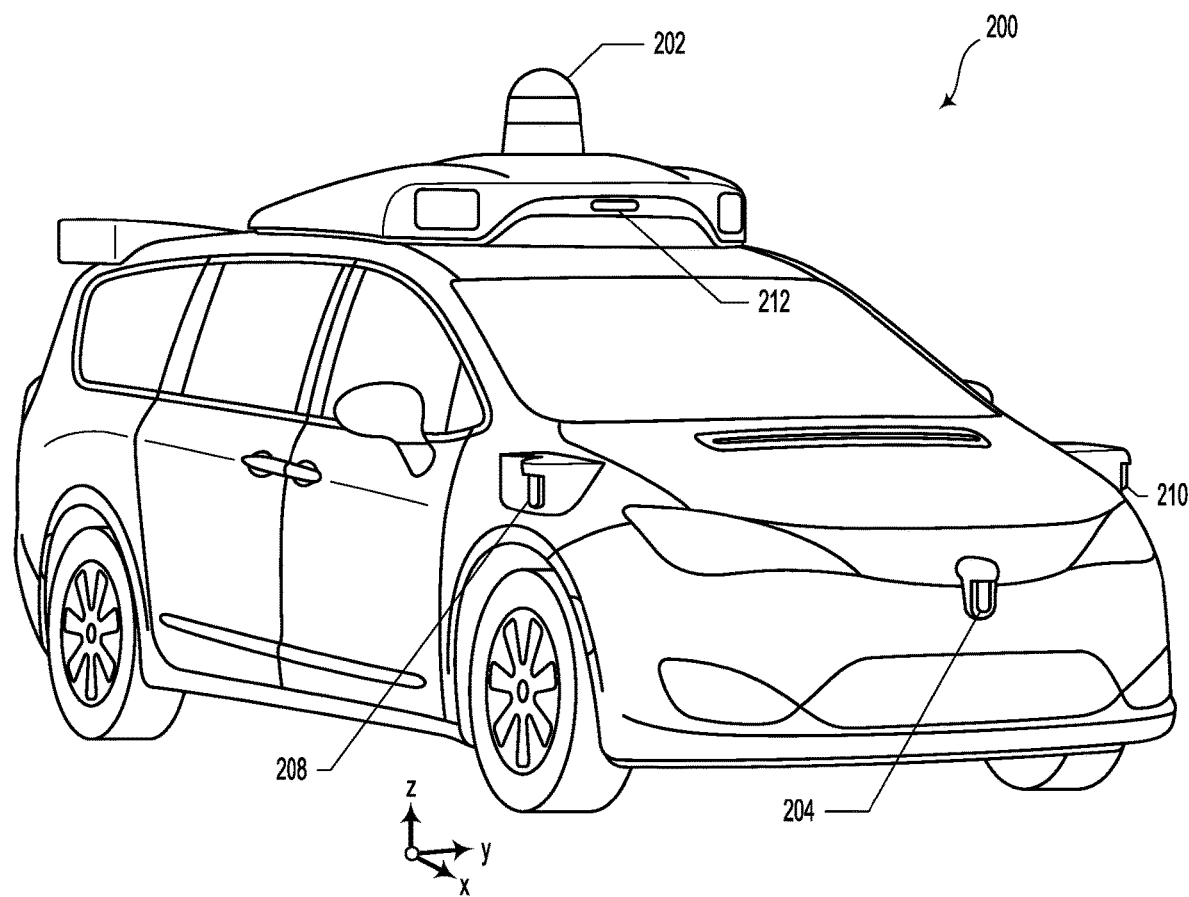
FIG. 4E illustrates a vehicle equipped with a sensor system, according to an example embodiment.

Example data patterns are shown in FIGS. 3A-3B. The data pattern 150 shown in FIG. 3A includes a first plurality of bits 152 and a second plurality of bits 154. The first plurality of bits 152 have a first average value. The second plurality of bits 154 has a second average value, wherein the second average value is lower than the first average value. In the data pattern 150, each bit of the first plurality of bits 152 is a 1 and each bit of the second plurality of bits 154 is a 0. Accordingly, the first and second average values are 1 and 0 respectively.

The first plurality of bits 152 and the second plurality of bits 154 together form a single waveform 151. It is understood that the data pattern 150 comprises the waveform 151 repeated a plurality of times.

In operation, the data transmission rate of the system and the write speed of the computer readable memory is known. Accordingly, the amount of time it takes to transmit a single bit, 1 unit interval or "UI", is known. The amount of time required to write the waveform 151, or the waveform period, is equal to 1 UI times the number of bits in the waveform 151. The frequency replicated by the data pattern is the inverse of the waveform period. For example, the waveform 151 shown in FIG. 3A comprises ten bits. If each bit has a unit interval of 0.0001 seconds, the waveform period is 0.001 seconds. Thus, the data pattern 151 replicates a frequency of 1000 Hz or 1E3 Hz.

FIG. 3B illustrates an example data pattern 160. The data pattern 160 includes a first plurality of bits 162 and a second plurality of bits 164 which together form a waveform 161. The first plurality of bits 162 has a first average value. The second plurality of bits 164 has a second average value, wherein the second average value is lower than the first average value. The first plurality of bits 162 alternates between a 1 and a 0 with every other bit. Accordingly, the first plurality of bits 162 has an average value of 0.5. The second plurality of bits 164 has an average value of 0.

In operation, rapid switching can result in increased noise on the power distribution network. Accordingly, rapid switching within a data pattern 160 replicating the resonant frequency of the power distribution network increases the potential for error.

In some embodiments, the computer readable memory 104 includes an interface configured to read and write multiple bits of data simultaneously. For example, the memory interface is 8, 16, 32, or 64 bites wide. In operation, the data patterns replicating the resonant frequency of the power distribution network, or other component of the system, is transmitted alone a plurality of the memory lines simultaneously such that identical data patterns are being written in parallel. This causes synchronized switching along the plurality of memory lines, resulting in further increased impedance and noise on the power distribution network.

In some embodiments, the exact resonant frequency of the system components is not known. For example, the resonant frequency can change over time due to environmental factors and/or wear. Alternatively or additionally, the system may experience resonance at multiple frequencies. Accordingly, the data pattern replicating the resonant frequency of at least a portion of the system sweeps through a range of frequencies. The data pattern includes at least a first plurality of waveforms having a first waveform period and a second plurality of waveforms having a second waveform period, wherein the second waveform period is different from the first waveform period.

In some forms, the computer readable memory 104 stores a frequency approximating the desired resonant frequency.

The desired resonant frequency can be approximated using test data from previous resonance tests, and or calculated based on the structure of the system. The first plurality of waveforms has a frequency below the approximated frequency and the second plurality of waveforms has a frequency above the approximated frequency.

The system 100 described above is usable within an autonomous vehicle. FIGS. 4A, 4B, 4C, 4D, and 4E illustrate a vehicle 200, according to an example embodiment. In some embodiments, the vehicle 200 could be a semi- or fully-autonomous vehicle. While FIGS. 4A, 4B, 4C, 4D, and 4E illustrates vehicle 200 as being an automobile (e.g., a passenger van), it will be understood that vehicle 200 could include another type of autonomous vehicle, robot, or drone that can navigate within its environment using sensors and other information about its environment.

In some examples, the vehicle 200 may include one or more sensor systems 202, 204, 206, 208, 210, and 212. In some embodiments, sensor systems 202, 204, 206, 208, 210, and/or 212 could include sensor 102 as illustrated and described in relation to FIG. 1. In other words, the systems described elsewhere herein could be coupled to the vehicle 200 and/or could be utilized in conjunction with various operations of the vehicle 200. As an example, the system 100 could be utilized to test memory devices used in the self-driving or other types of navigation, planning, perception, and/or mapping operations of the vehicle 200.

While the one or more sensor systems 202, 204, 206, 208, 210, and 212 are illustrated on certain locations on vehicle 200, it will be understood that more or fewer sensor systems could be utilized with vehicle 200. Furthermore, the locations of such sensor systems could be adjusted, modified, or otherwise changed as compared to the locations of the sensor systems illustrated in FIGS. 4A, 4B, 4C, 4D, and 4E.

One or more of the sensor systems 202, 204, 206, 208, 210, and/or 212 could include LIDAR sensors. For example, the LIDAR sensors could include a plurality of light-emitter devices arranged over a range of angles with respect to a given plane (e.g., the x-y plane). For example, one or more of the sensor systems 202, 204, 206, 208, 210, and/or 212 may be configured to rotate about an axis (e.g., the z-axis) perpendicular to the given plane so as to illuminate an environment around the vehicle 200 with light pulses. Based on detecting various aspects of reflected light pulses (e.g., the elapsed time of flight, polarization, intensity, etc.), information about the environment may be determined.

In an example embodiment, sensor systems 202, 204, 206, 208, 210, and/or 212 may be configured to provide respective point cloud information that may relate to physical objects within the environment of the vehicle 200. While vehicle 200 and sensor systems 202, 204, 206, 208, 210, and 212 are illustrated as including certain features, it will be understood that other types of sensor systems are contemplated within the scope of the present disclosure.

While LIDAR systems with single light-emitter devices are described and illustrated herein, LIDAR systems with multiple light-emitter devices (e.g., a light-emitter device with multiple laser bars on a single laser die) are also contemplated. For example, light pulses emitted by one or more laser diodes may be controllably directed about an environment of the system. The angle of emission of the light pulses may be adjusted by a scanning device such as, for instance, a mechanical scanning mirror and/or a rotational motor. For example, the scanning devices could rotate in a reciprocating motion about a given axis and/or rotate about a vertical axis. In another embodiment, the light-emitter device may emit light pulses towards a spinning prism mirror, which may cause the light pulses to be emitted into the environment based on an angle of the prism mirror angle when interacting with each light pulse. Additionally or alternatively, scanning optics and/or other types of electro-opto-mechanical devices are possible to scan the light pulses about the environment. While FIGS. 4A-4E illustrate various lidar sensors attached to the vehicle 200, it will be understood that the vehicle 200 could incorporate other types of sensors.

The vehicle 200 may also include additional types of sensors mounted on the exterior thereof, such as the temperature sensor, sound sensor, LIDAR sensor, RADAR sensor, SONAR sensor, and/or cameras described above. Each of these additional types of sensors would be communicably coupled to computer readable memory.

Figure 5:
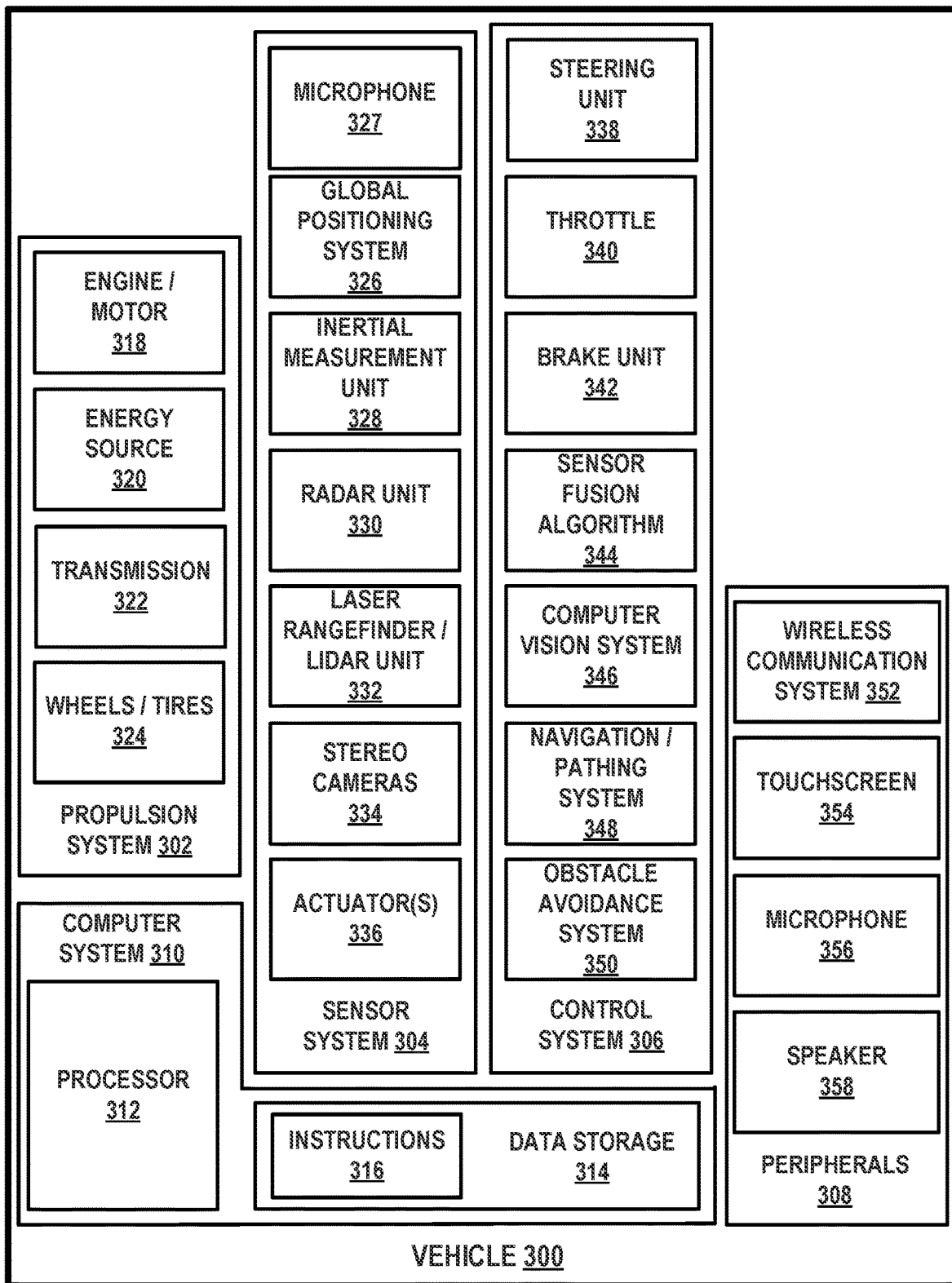
FIG. 5 is a simplified block diagram of a vehicle, according to example embodiments.

FIG. 5 is a simplified block diagram of a vehicle 300, according to an example embodiment. As shown, the vehicle 300 includes a propulsion system 302, a sensor system 304, a control system 306, peripherals 308, and a computer system 310. In some embodiments, vehicle 300 may include more, fewer, or different systems, and each system may include more, fewer, or different components. Additionally, the systems and components shown may be combined or divided in any number of ways. For instance, control system 306 and computer system 310 may be combined into a single system.

Propulsion system 302 may be configured to provide powered motion for the vehicle 300. To that end, as shown, propulsion system 302 includes an engine/motor 318, an energy source 320, a transmission 322, and wheels/tires 324.

The engine/motor 318 may be or include any combination of an internal combustion engine, an electric motor, a steam engine, and a Sterling engine. Other motors and engines are possible as well. In some embodiments, propulsion system 302 may include multiple types of engines and/or motors. For instance, a gas-electric hybrid car may include a gasoline engine and an electric motor. Other examples are possible.

Energy source 320 may be a source of energy that powers the engine/motor 318 in full or in part. That is, engine/motor 318 may be configured to convert energy source 320 into mechanical energy. Examples of energy sources 320 include gasoline, diesel, propane, other compressed gas-based fuels, ethanol, solar panels, batteries, and other sources of electrical power. Energy source(s) 320 may additionally or alternatively include any combination of fuel tanks, batteries, capacitors, and/or flywheels. In some embodiments, energy source 320 may provide energy for other systems of the vehicle 300 as well. To that end, energy source 320 may additionally or alternatively include, for example, a rechargeable lithium-ion or lead-acid battery. In some embodiments, energy source 320 may include one or more banks of batteries configured to provide the electrical power to the various components of vehicle 300.

Transmission 322 may be configured to transmit mechanical power from the engine/motor 318 to the wheels/tires 324. To that end, transmission 322 may include a gearbox, clutch, differential, drive shafts, and/or other elements. In embodiments where the transmission 322 includes drive shafts, the drive shafts may include one or more axles that are configured to be coupled to the wheels/tires 324.

Wheels/tires 324 of vehicle 300 may be configured in various formats, including a unicycle, bicycle/motorcycle, tricycle, or car/truck four-wheel format. Other wheel/tire formats are possible as well, such as those including six or more wheels. In any case, wheels/tires 324 may be configured to rotate differentially with respect to other wheels/tires 324. In some embodiments, wheels/tires 324 may include at least one wheel that is fixedly attached to the transmission 322 and at least one tire coupled to a rim of the wheel that could make contact with the driving surface. Wheels/tires 324 may include any combination of metal and rubber, or combination of other materials. Propulsion system 302 may additionally or alternatively include components other than those shown.

Sensor system 304 may include a number of sensors configured to sense information about an environment in which the vehicle 300 is located, as well as one or more actuators 336 configured to modify a position and/or orientation of the sensors. The sensor system 304 further includes computer readable memory which receives and stores data from the sensors. As shown, sensor system 304 includes a microphone 327, a Global Positioning System (GPS) 326, an inertial measurement unit (IMU) 328, a RADAR unit 330, a laser rangefinder and/or LIDAR unit 332, and a stereo camera system 334. Sensor system 304 may include additional sensors as well, including, for example, sensors that monitor internal systems of the vehicle 300 (e.g., an 02 monitor, a fuel gauge, an engine oil temperature, etc.). Other sensors are possible as well.

The microphone module 327 may be any sensor (e.g., acoustic sensor) configured to detect and record sounds originating outside of the vehicle 300.

GPS 326 may be any sensor (e.g., location sensor) configured to estimate a geographic location of vehicle 300. To this end, the GPS 326 may include a transceiver configured to estimate a position of the vehicle 300 with respect to the Earth.

IMU 328 may be any combination of sensors configured to sense position and orientation changes of the vehicle 300 based on inertial acceleration. In some embodiments, the combination of sensors may include, for example, accelerometers, gyroscopes, compasses, etc.

RADAR unit 330 may be any sensor configured to sense objects in the environment in which the vehicle 300 is located using radio signals. In some embodiments, in addition to sensing the objects, RADAR unit 330 may additionally be configured to sense the speed and/or heading of the objects.

Similarly, laser range finder or LIDAR unit 332 may be any sensor configured to sense objects in the environment in which vehicle 300 is located using lasers. For example, LIDAR unit 332 may include one or more LIDAR devices, at least some of which may be included in the system 100, for instance.

The stereo cameras 334 may be any cameras (e.g., a still camera, a video camera, etc.) configured to capture images of the environment in which the vehicle 300 is located.

Control system 306 may be configured to control one or more operations of vehicle 300 and/or components thereof. To that end, control system 306 may include a steering unit 338, a throttle 340, a brake unit 342, a sensor fusion algorithm 344, a computer vision system 346, navigation or pathing system 348, and an obstacle avoidance system 350.

Steering unit 338 may be any combination of mechanisms configured to adjust the heading of vehicle 300. Throttle 340 may be any combination of mechanisms configured to control engine/motor 318 and, in turn, the speed of vehicle 300. Brake unit 342 may be any combination of mechanisms configured to decelerate vehicle 300. For example, brake unit 342 may use friction to slow wheels/tires 324. As another example, brake unit 342 may convert kinetic energy of wheels/tires 324 to an electric current.

Sensor fusion algorithm 344 may be an algorithm (or a computer program product storing an algorithm) configured to accept data from sensor system 304 as an input. The sensor fusion algorithm 344 is operated on a processor, such as the external processor discussed above. The data may include, for example, data representing information sensed by sensor system 304. Sensor fusion algorithm 344 may include, for example, a Kalman filter, a Bayesian network, a machine learning algorithm, an algorithm for some of the functions of the methods herein, or any other sensor fusion algorithm. Sensor fusion algorithm 344 may further be configured to provide various assessments based on the data from sensor system 304, including, for example, evaluations of individual objects and/or features in the environment in which vehicle 300 is located, evaluations of particular situations, and/or evaluations of possible impacts based on particular situations. Other assessments are possible as well.

Computer vision system 346 may be any system configured to process and analyze images captured by stereo cameras 334 in order to identify objects and/or features in the environment in which vehicle 300 is located, including, for example, traffic signals and obstacles. To that end, computer vision system 346 may use an object recognition algorithm, a Structure from Motion (SFM) algorithm, video tracking, or other computer vision techniques. In some embodiments, computer vision system 346 may additionally be configured to map the environment, track objects, estimate the speed of objects, etc.

Navigation and pathing system 348 may be any system configured to determine a driving path for vehicle 300. Navigation and pathing system 348 may additionally be configured to update a driving path of vehicle 300 dynamically while vehicle 300 is in operation. In some embodiments, navigation and pathing system 348 may be configured to incorporate data from sensor fusion algorithm 344, GPS 326, microphone 327, LIDAR unit 332, and/or one or more predetermined maps so as to determine a driving path for vehicle 300.

Obstacle avoidance system 350 may be any system configured to identify, evaluate, and avoid or otherwise negotiate obstacles in the environment in which vehicle 300 is located. Control system 306 may additionally or alternatively include components other than those shown.

Peripherals 308 may be configured to allow vehicle 300 to interact with external sensors, other vehicles, external computing devices, and/or a user. To that end, peripherals 308 may include, for example, a wireless communication system 352, a touchscreen 354, a microphone 356, and/or a speaker 358.

Wireless communication system 352 may be any system configured to wirelessly couple to one or more other vehicles, sensors, or other entities, either directly or via a communication network. To that end, wireless communication system 352 may include an antenna and a chipset for communicating with the other vehicles, sensors, servers, or other entities either directly or via a communication network. The chipset or wireless communication system 352 in general may be arranged to communicate according to one or more types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities.

Touchscreen 354 may be used by a user to input commands to vehicle 300. To that end, touchscreen 354 may be configured to sense at least one of a position and a movement of a user's finger via capacitive sensing, resistance sensing, or a surface acoustic wave process, among other possibilities. Touchscreen 354 may be capable of sensing finger movement in a direction parallel or planar to the touchscreen surface, in a direction normal to the touchscreen surface, or both, and may also be capable of sensing a level of pressure applied to the touchscreen surface. Touchscreen 354 may be formed of one or more translucent or transparent insulating layers and one or more translucent or transparent conducting layers. Touchscreen 354 may take other forms as well.

Microphone 356 may be configured to receive audio (e.g., a voice command or other audio input) from a user of vehicle 300. Similarly, speakers 358 may be configured to output audio to the user.

Computer system 310 may be configured to transmit data to, receive data from, interact with, and/or control one or more of propulsion system 302, sensor system 304, control system 306, and peripherals 308. To this end, computer system 310 may be communicatively linked to one or more of propulsion system 302, sensor system 304, control system 306, and peripherals 308 by a system bus, network, and/or other connection mechanism (not shown).

In one example, computer system 310 may be configured to control operation of transmission 322 to improve fuel efficiency. As another example, computer system 310 may be configured to cause camera 334 to capture images of the environment. As yet another example, computer system 310 may be configured to store and execute instructions corresponding to sensor fusion algorithm 344. As still another example, computer system 310 may be configured to store and execute instructions for determining a 3D representation of the environment around vehicle 300 using LIDAR unit 332. Thus, for instance, computer system 310 could function as a controller for LIDAR unit 332. Other examples are possible as well.

As shown, computer system 310 includes processor 312 and data storage 314. Processor 312 may comprise one or more general-purpose processors and/or one or more special-purpose processors. To the extent that processor 312 includes more than one processor, such processors could work separately or in combination.

In some examples, the computer system 310 is configured to execute instructions stored in computer readable memory which cause a copy of a data pattern replicating the resonant frequency of a component of the system to be written to memory as described above. In some forms, the computer system 310 is configured to cause resonance test described above to occur when a series of other parameters are met. For example, the computer system 310 can run the resonance test when the vehicle is stationary and/or when one or more of the sensors are not in use. In some embodiments, the computer system 310 includes a clock. The computer system 310 causes the vehicle to perform maintenance procedures, including the resonance test at pre-scheduled times or after a predetermined amount of time from the previous resonance test.

Data storage 314, in turn, may comprise one or more volatile and/or one or more non-volatile storage components, such as optical, magnetic, and/or organic storage, and data storage 314 may be integrated in whole or in part with processor 312. In some embodiments, data storage 314 may contain instructions 316 (e.g., program logic) executable by processor 312 to cause vehicle 300 and/or components thereof (e.g., LIDAR unit 332, etc.) to perform the various operations described herein. Data storage 314 may contain additional instructions as well, including instructions to transmit data to, receive data from, interact with, and/or control one or more of propulsion system 302, sensor system 304, control system 306, and/or peripherals 308.

In some embodiments, vehicle 300 may include one or more elements in addition to or instead of those shown. For example, vehicle 300 may include one or more additional interfaces and/or power supplies. Other additional components are possible as well. In such embodiments, data storage 314 may also include instructions executable by processor 312 to control and/or communicate with the additional components. Still further, while each of the components and systems are shown to be integrated in vehicle 300, in some embodiments, one or more components or systems may be removably mounted on or otherwise connected (mechanically or electrically) to vehicle 300 using wired or wireless connections. Vehicle 300 may take other forms as well.

Figure 6:
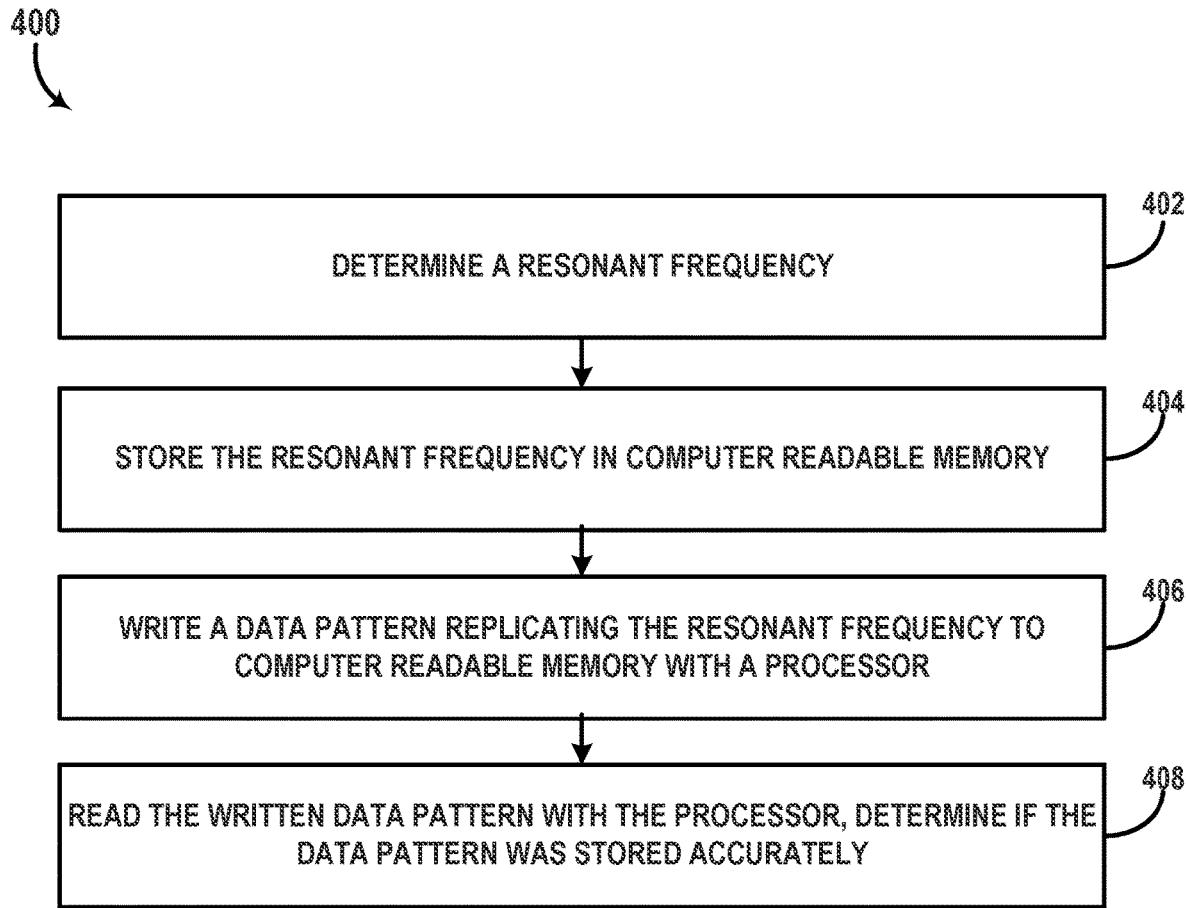
FIG. 6 is a flowchart of a method, according to example embodiments.

FIG. 6 is a flowchart of a method 400, according to example embodiments. The method 400 presents an embodiment of a method that could be used with the system 100 or the vehicles 200 and 300, for example. Method 400 may include one or more operations, functions, or actions as illustrated by one or more of blocks 402-408. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation. The method 400 is a method of testing a memory having device. More specifically, the method 400 is a method of testing the accuracy of the memory having device while one or more portions of the memory having device are experiencing resonance.

In addition, for method 400 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for method 400 and other processes and methods disclosed herein, each block in FIG. 4 may represent circuitry that is wired to perform the specific logical functions in the process.

At block 402, method 400 involves determining a resonant frequency. The resonant frequency is the resonant frequency of at least a portion of a system having computer readable memory. For example, the resonant frequency could be the resonant frequency of the power distribution network 112 of the system 100 described above.

The resonant frequency can be determined in a variety of ways. In some embodiments, the impedance of the device is measured while a data pattern sweeping through a range of frequencies is written to the computer readable memory. The frequency at which the impedance is highest is determined to be the resonant frequency. Alternatively or additionally, the resonant frequency is approximated based on the structure of the system.

At block 404, method 400 involves storing the determined resonant frequency in computer readable memory. In some embodiments, the determined resonant frequency is stored in the form of a data pattern replicating the resonant frequency. The data pattern can replicate just the resonant frequency, or a range of frequencies surrounding the resonant frequency. Alternatively or additionally, the resonant frequency is stored as a value, so as to be used to generate a data pattern for resonance testing.

At block 406, a controller writes a data pattern replicating the resonant frequency to computer readable memory. As discussed above, the data pattern can replicate just the resonant frequency, or a range of frequencies surrounding the resonant frequency. The data pattern can be written to the specific memory device storing the resonant frequency or to a different memory device.

At block 408, the controller reads the written data pattern and compares the read data to the transmitted data to determine if the data pattern was stored accurately.

The above examples of systems and methods for resonance testing involve sensor systems and specifically sensor systems for autonomous vehicles. It is understood that the systems and methods should not be limited to sensor systems or to autonomous vehicles. The systems and methods for resonance testing can be used in other systems having computer readable memory and a controller.

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures. Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations.

What is claimed is:

1. A method of testing a memory device, the method comprising:
   transmitting to the memory device, through an electrical system, a data pattern that replicates at least a resonant frequency of at least a portion of the electrical system, to provide a written data pattern in the memory device; and
   determining whether the written data pattern matches the data pattern transmitted to the memory device.

2. The method of claim 1, wherein determining whether the written data pattern matches the data pattern transmitted to the memory device comprises reading the written data pattern from the memory device to establish a read data pattern, and comparing the read data pattern with the data pattern transmitted to the memory device.

3. The method of claim 1, further comprising:
   responsive to determining that the written data pattern does not match the data pattern transmitted to the memory device, providing an alert.

4. The method of claim 1, wherein the memory device is in a vehicle, and wherein the method is performed as part of a power-on self-test sequence of the vehicle.

5. The method of claim 1, wherein the memory device is part of a sensor system, and wherein the method is performed without putting the sensor system in a test state.

6. The method of claim 5, wherein the sensor system comprises a sensor, and wherein the method is performed automatically when the sensor is not providing data for storage in the memory device.

7. The method of claim 1, wherein the method is performed periodically.

8. The method of claim 1, wherein transmitting the data pattern to the memory device through the electrical system comprises transmitting the data pattern simultaneously on each of multiple memory lines.

9. The method of claim 1, wherein the portion of the electrical system comprises a power distribution network of an integrated circuit.

10. A system comprising:
    a controller; and
    computer-readable memory,
    wherein the controller is configured to transmit to the computer-readable memory a data pattern that replicates at least a resonant frequency of at least a portion of the system, to provide a written data pattern in the computer-readable memory, and
    wherein the controller is configured to determine whether the written data pattern matches the data pattern transmitted to the computer-readable memory.

11. The system of claim 10, wherein determining whether the written data pattern matches the data pattern transmitted to the computer-readable memory comprises reading the written data pattern from the computer-readable memory to establish a read data pattern, and comparing the read data pattern with the data pattern transmitted to the computer-readable memory.

12. The system of claim 10, wherein the controller is configured to provide an alert when the controller determines that the written data pattern does not match the data pattern transmitted to the computer-readable memory.

13. The system of claim 10, wherein the computer-readable memory is in a vehicle, and wherein the controller is configured to perform the transmitting and determining as part of a power-on self-test sequence of the vehicle.

14. The system of claim 10, wherein the memory device is part of a sensor system, and wherein the method is performed without putting the sensor system in a test state.

15. The system of claim 14, wherein the sensor system comprises a sensor, and wherein the operations are performed automatically when the sensor is not providing data for storage in the memory device.

16. The system of claim 10, wherein the controller is configured to periodically perform the transmitting and determining.

17. The system of claim 10, wherein transmitting the data pattern to the computer-readable memory comprises transmitting the data pattern simultaneously on each of multiple memory lines.

18. The system of claim 10, wherein the portion of the electrical system comprises a power distribution network.

19. A non-transitory computer-readable medium having stored thereon instructions executable by a processor to carry out operations including:
- transmitting to a memory device, through an electrical system, a data pattern that replicates at least a resonant frequency of at least a portion of the electrical system, to provide a written data pattern in the memory device; and
- determining whether the written data pattern matches the data pattern transmitted to the memory device.

20. The non-transitory computer-readable medium of claim 19, wherein the memory device is the non-transitory computer-readable medium.

* * * * *